United States Patent Office 2,723,522
Patented Nov. 15, 1955

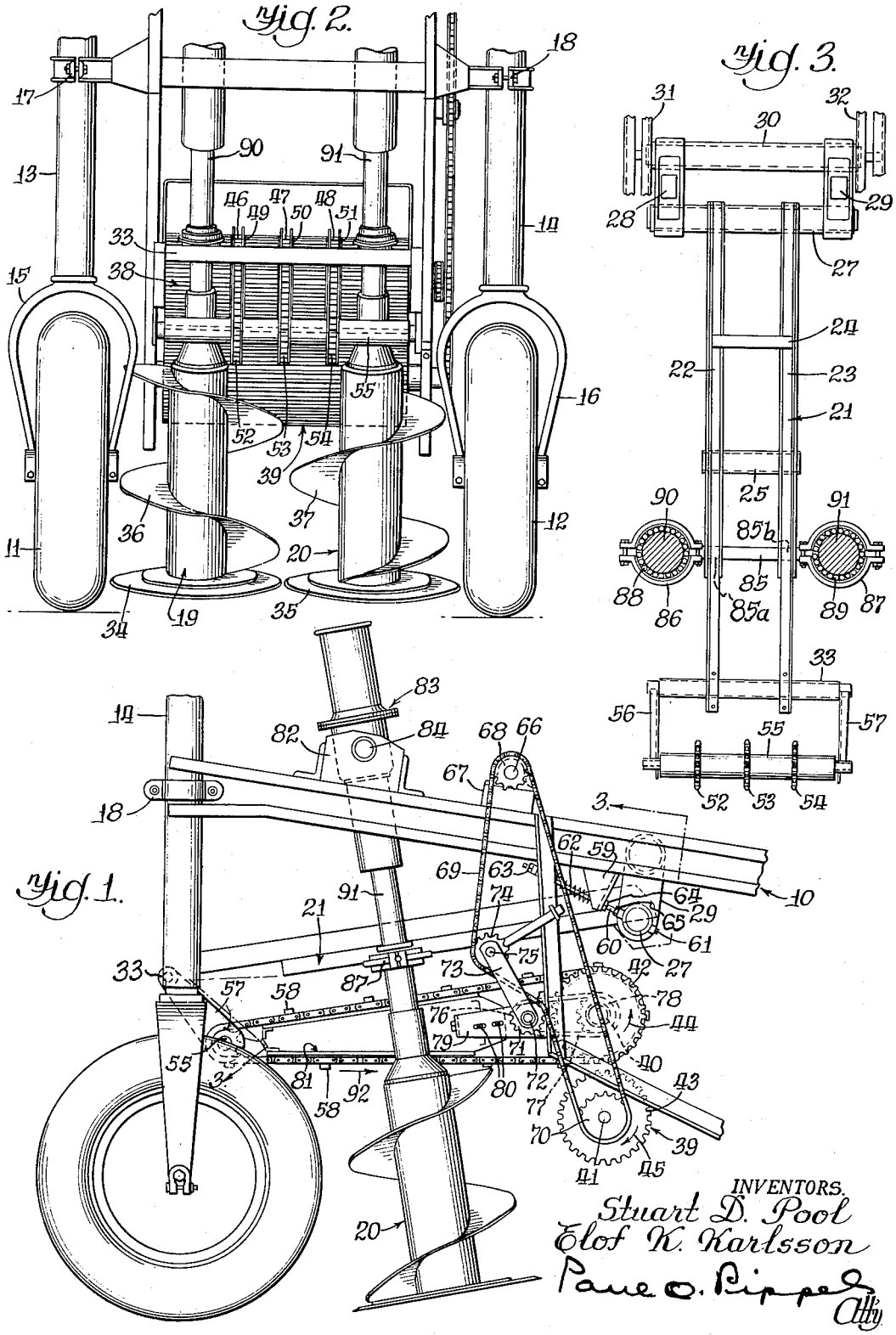

2,723,522

CONVEYOR FEEDER MECHANISM FOR REMOVING CROP MATERIAL CUT AND ELEVATED BY COOPERATIVE AUGERS

Stuart D. Pool and Elof K. Karlsson, Moline, Ill., assignors to International Harvester Company, a corporation of New Jersey Application November 7, 1952, Serial No. 319,312

12 Claims. (Cl. 56—157)

This invention relates to a new and improved conveyor feeder mechanism for removing crop material cut and elevated by cooperative augers.

The present invention is adapted for use on a cane harvester of the type set forth and shown in the copending application of Shafer et al., Serial No. 133,018, filed December 15, 1949, now Patent No. 2,648,943. The cane harvester employs substantially vertically disposed cooperative augers having cutting discs at the lower ends thereof and arranged and positioned at the forward end of the harvesting vehicle for the purpose of cutting the cane stalks at their lower ends and elevating the butt ends of the stalks between the cooperative augers and thereupon delivering the stalks longitudinally through the harvesting mechanism. The present invention concerns itself with the means for removing and feeding cane stalks or any other harvested crop material which may be elevated by cooperative vertically disposed augers.

A principal object of the present invention is therefore to provide conveyor means in conjunction with the cane harvester and arranged and constructed to deliver horizontally disposed stalks in a horizontal plane away from cooperative elevating augers.

An important object of this invention is the provision of elongated feeder conveyor means at the upper discharge ends of cooperative stalk cutting and elevating augers.

Another and further important object of this invention is to supply means for removing crop material at the point of uppermost elevation of that crop by cooperative auger means and including a chain conveyor having intermittently disposed lugs thereon projecting forwardly and rearwardly of the vertical plane containing the cooperative elevating augers.

Still another important object of this invention is to provide a pair of cooperative stalk feeding rolls disposed rearwardly of cooperative stalk elevating augers and having conveyor means adapted to guide and deliver stalks from the vertically elevating augers to the cooperative feed rolls.

Another and still further important object of this invention is the provision of means in a cane harvester employing vertically disposed crop elevating augers for a plural chain conveyor means disposed at the upper ends of the cooperative augers and in conjunction with vertically spaced apart cooperative feed rolls and wherein the plural chain conveyor employs one of the feed rolls for securing direct drive for the chains.

Still another important object of this invention is to provide corrugated feed rolls to receive cane stalks in a horizontal plane and wherein laterally spaced apart lug chains are draped about the upper feed roll and extend forwardly therefrom to constitute a guide for stalks elevated by cooperative augers.

Other and further important objects of this invention will become apparent from the disclosures in the following specification and accompanying drawing.

In the drawing:

Fig. 1 is a side elevational view of a portion of the cane harvester of this invention;

Fig. 2 is a front elevational view of the device as shown in Fig. 1; and

Fig. 3 is a sectional view taken on the line 3—3 of Fig. 1.

As shown in the drawing the forward end of a frame supporting structure 10 is carried on spaced apart dirigible wheels 11 and 12. The wheels 11 and 12 are mounted on vertically disposed bolsters 13 and 14, respectively, with the aid of intermediately disposed forks 15 and 16. The bolsters 13 and 14 are clamped to the frame supporting structure 10 at 17 and 18, respectively.

The cane harvester is of the type employing substantially vertically disposed cooperative augers 19 and 20 such as set forth in the copending application of Shafer et al. mentioned above. The cooperative augers 19 and 20 are positioned substantially between the spaced apart dirigible wheels 11 and 12 and slightly to the rear thereof. As best shown in Figs. 1 and 3 the augers are carried on the frame supporting structure 10 and guided by suitable bearings on a sub-frame structure 21 comprising spaced apart members 22 and 23 and joining cross members 24 and 25. The frame structure 21 is normally disposed in an inclined position forwardly and downwardly from a pivotal mounting about a transversely disposed shaft 27. The shaft 27 is supported at its ends by link members 28 and 29 which are in turn pivotally mounted in parallelism on a cross shaft 30 fixedly mounted between spaced members 31 and 32 of the main frame 10. The forward end of the sub-frame structure 21 is provided with a cross shaft member 33.

The lower ends of the augers 19 and 20 are equipped with relatively large knife edged discs 34 and 35, respectively. These discs closely abut each other and cooperate to effect a cutting of standing cane at a level closely adjacent the ground line. The cane harvester is adapted to traverse a field of standing cane stalks ready for harvest and it is the function of the cooperative disc cutters 34 and 35 to cut the stalks at their butt ends closely adjacent the roots of the cane and whereafter it is the function of the cooperative augers 19 and 20 to effect a raising of the stalks between the augers by reason of the intercalation of the spiral flight 36 and 37 of the augers. The severed cane stalks are thus elevated by the augers resulting in a positioning of the stalks in a horizontal plane spaced above the ground line. Immediately upon the cane arriving at the upper ends of the cooperative augers 19 and 20, it is essential that the stalks be quickly removed by propelling them rearwardly into other elements of the cane harvesting machine.

Cooperative feed rolls 38 and 39 have their axes of rotation 40 and 41 vertically spaced apart so that the peripheral surfaces of the rolls have rubbing contact one with the other. Further, the cylindrical surfaces of the feed rolls 38 and 39 are provided with transversely extending corrugations or ribs 42 and 43 for more effectively grasping the cane stalks and causing a rearward movement of the stalks within the cane harvester. The direction of rotation of the upper roll 38 is shown by the arrow 44 and, similarly, the rotation of the lower corrugated surfaced roll 39 is indicated by the arrow 45. It should be apparent that at the juncture of the rolls 38 and 39 at the forward end of the machine toward the dirigible wheels 11 and 12 the rolls turn inwardly toward each other providing a rearwardly moving force between the abutting peripheral surfaces. It should be noticed that the juncture between the cooperative rolls 38 and 39 is on a substantially horizontal level with the upper ends of the cooperative augers 19 and 20 so that stalks fed from the augers may be directly delivered to the cooperative feed rolls 38 and 39.

The principal object of the present invention as above stated is to provide means adjacent the upper ends of the cooperative augers for guiding and delivering cane stalks from the augers to the cooperative feed rolls and thence to further treatment by the cane harvesting machine. A plurality of transversely spaced apart chains are shown at 46, 47 and 48, each of these endless chains is adapted to extend around and within annular grooves 49, 50 and 51 within the upper corrugated feed roll 38. The forward ends of the endless chains are carried on spaced apart sprockets 52, 53 and 54 respectively mounted on a shaft 55 which in turn is carried in spaced apart depending arms 56 and 57. The arms 56 and 57 are hingedly mounted on the cross member 33 joining the frame structure 21. The three laterally spaced apart chains 46, 47 and 48 with their lower flights disposed substantially horizontally are provided with lugs 58 and thus perform the function of uniformly driving the raised cane stalks rearwardly into the feed throat defined by the cooperative corrugated rollers 38 and 39. The forward end of the frame structure 21 and including the stalk moving chains 46, 47 and 48 is freely suspended at its forward end and may move in an arcuate path as the spaced arms 56 and 57 swing about their pivoting cross shaft 33. The plurality of lugged chains are disposed between the vertical axes of the augers 19 and 20.

As best shown in Fig. 1, a bracket 59 is fixedly attached to the underside of the main frame 10 at a position close to and slightly forward of the hinged links 28 and 29. A rod 60 is adapted to slide through the bracket 59 and is fastened at 61 to the lower ends of the links 28 and 29 at and through the transversely positioned shaft 27. A compression spring 62 surrounds the rod 60 between the fixed bracket 59 and a nut 63 mounted on the far end of the rod. Stop nuts 64 and 65 are provided on the rod 60 adjacent the fixed bracket 59 and the hinging shaft 27. The spring thus normally urges the shaft 27 forwardly toward the fixed bracket 59. It is thus apparent that the resultant movement of the shaft 27 by reason of the spring 62 will tend to maintain the proper tautness of the three stalk moving chains 46, 47 and 48.

A shaft 66 is driven by any suitable means. A sprocket 68 is fastened to the shaft 66 and is adapted to impart movement to a chain 69. The chain 69 in addition to passing over the driving sprocket 68 is adapted to extend downwardly and rearwardly for engagement with the sprocket 70 on the shaft 41 carrying the lower corrugated feed roller 39. A sprocket 71 is mounted on a shaft 72 carried on a bracket arm 73. The chain 69 is wrapped around the inner side of the sprocket 71 and thence out around a spaced apart sprocket 74 which is carried on a shaft 75 at the other end of the link arm 73. With the aid of the sprockets 71 and 74 which act as idlers the chain 69 is adapted to provide rotary motion to the corrugated feed roller 39 and to the chains 46, 47 and 48 in the proper directions. The shaft 72 also carries a second sprocket 76 behind the sprocket 71 and with the aid of a chain 77 rotational drive is imparted from the sprocket 76 to a sprocket 78 mounted on the shaft 40 along with the corrugated feed roll 38. The cooperative corrugated feed rolls 38 and 39 are thus driven in opposite directions by means of the single chain 69. Inasmuch as the chains 46, 47 and 48 are driven concurrently with the corrugated roller 38, the chains thus run in the same direction as the roller 38 as indicated by the arrow 44. A chain tightener 79 carries the sprocket 72 and by means of elongated slots 80 the sprockets 71 and 76 and their unitary shaft 72 may be moved in a relatively arcuate path defined by the swinging of the links 73 about the shaft 75. A guide member 81 is disposed between the upper and lower flights of the chains 46, 47 and 48, thus maintaining the lower flight thereof relatively parallel with respect to the ground whereupon the cane stalks harvested are fed rearwardly in a substantially horizontal plane to the cooperative feed rolls 38 and 39.

Supporting members 82 are mounted on the top of the main frame 10 spaced rearwardly of the front bolsters 13 and 14 and are adapted to carry spaced apart gear cases 83 which are carried in the supporting members 82 in the manner of a trunnion as shown at 84. It will merely be stated in this application that the auger conveyors 19 and 20 are capable of moving upwardly and/or downwardly, depending upon the torque required to rotate the augers. However, inasmuch as this construction forms no part of the present invention other than for environment, the details are not shown herein. As best shown in Fig. 3, a transversely disposed shaft 85 carried on the frame structure 21 at 85a and 85b constitutes a pivotal mounting for the augers 19 and 20. Bearing brackets 86 and 87 are journally mounted on the shaft 85 and carry annular ball bearings 88 and 89 respectively for receiving shaft portions 90 and 91 of the auger conveyors 19 and 20. The augers thus may have a slight pivotal movement fore and aft of the cane harvester by reason of the pivoting of the sub-frame structure 21 about the shaft 27 and the pivoted hanging of the augers on the cross shaft 85. Further the augers by their shafts 90 and 91 may conveniently be rotated within the ball bearings 88 and 89.

In operation the cane harvester of this invention traverses a field of standing cane to be harvested. The stalks are cut at their lower ends by the cooperative disk cutters 34 and 35 and thereupon the butt ends are elevated first by the cooperative auger flights 36 and 37 of the fast rotating cooperative augers and whereafter the stalks are positively fed rearwardly in a horizontal plane by reason of the plurality of endless lugged chains 46, 47 and 48 all driven at a relatively high speed. The stalks arrive at the juncture between the vertically spaced apart cooperative corrugated rollers 38 and 39 by reason of the constant guiding of the stalks from the time they reach their uppermost position by the spiral flights 36 and 37 of the vertically disposed cooperative augers. Thereafter the corrugated rollers feed the stalks rearwardly through the machine for further treatment or for delivery to a trailing wagon, or the like. The lower flight of the chains 46, 47 and 48 move rearwardly in the direction of the arrow 92 as shown in Fig. 1. The lower flight of the lugged chains, as just stated, guides the stalks into the juncture between the rollers 38 and 39. The chains are in fact driven by the upper corrugated roller 38 and operate in annular grooves therein whereby the chains form a part of the peripheral surface of the feed roller. The continuous upward movement of the stalks by the cooperative auger flight 36 and 37 maintains the stalks firmly against the high speed undersides of the chains 46, 47 and 48 and thus there is a positive means for guiding the stalks from a position between the vertical axes of the augers to the feed rollers 38 and 39. The forwardly projecting portions of the chains 46, 47 and 48 beyond the cooperative augers 19 and 20 perform the dual function of bending the stalks downwardly and forwardly and engaging and gripping the stalks over a substantial length thereof for positive rearward feeding.

Numerous details of construction may be varied throughout a wide range without departing from the principles disclosed herein and we, therefore, do not propose limiting the patent granted hereon otherwise than is necessitated by the appended claims.

What is claimed is:

1. In a harvester comprising a frame structure, a pair of cooperative augers carried on said frame structure in a substantially vertical position, cutting means at the lower ends of said augers, and endless chain means carried on said frame structure and positioned substantially horizontally at the upper ends of said cooperative augers and between the vertical axes of said cooperative augers.

2. In a harvester comprising a frame structure, a pair of cooperative augers positioned in side by side relationship and disposed substantially vertically, means mounting said cooperative augers on said frame structure for vertical movement with respect thereto, cutting means at the lower ends of said augers, and endless conveyor chains mounted on said frame structure in a generally horizontal position and arranged and constructed for bodily vertical movement with the cooperative augers, and means driving said endless chains whereby crop material elevated by said cooperative augers is removed at the upper end by the endless chains.

3. A device as set forth in claim 2 in which the endless conveyor chains have spaced apart outwardly projecting lugs thereon.

4. A device as set forth in claim 2 in which the endless conveyor chains are disposed forwardly and rearwardly of said cooperative augers.

5. In a stalk harvester comprising a main frame structure extending in a generally fore and aft direction, a sub-frame structure hinged to said main frame structure intermediate its ends and extending forwardly and downwardly therefrom, a pair of side-by-side cooperative harvesting augers carried by said sub-frame structure and depending downwardly therefrom, said augers rotated at a high speed, endless chain means mounted on said sub-frame structure and disposed substantially horizontally at the upper ends of said cooperative augers, and said endless chain means driven at a high speed.

6. A device as set forth in claim 5 in which spring means is provided to normally urge said sub-frame structure forwardly and downwardly.

7. A device as set forth in claim 5 in which lug means are provided on said endless chain means.

8. A device as set forth in claim 5 in which said endless chain means includes a plurality of laterally spaced apart chains.

9. A device as set forth in claim 5 in which the stalk harvester includes a pair of vertically spaced cooperative feed rolls located beneath and adjacent to said hinge attachment of said sub-frame structure to said main frame structure, and said endless chain means extending between the upper ends of said cooperative augers and said vertically spaced cooperative feed rolls thus providing for positive stalk movement therebetween.

10. A device as set forth in claim 5 in which said endless chain means extends from a position forwardly of said cooperative augers to a position rearwardly of said cooperative augers.

11. In a harvester comprising a frame structure, a pair of cooperative augers carried on said frame structure in a substantially vertical position, cutting means at the lower ends of said augers, and endless conveyor means mounted on said frame structure and positioned substantially horizontally at the upper ends of said cooperative augers and between the vertical axes of said cooperative augers.

12. In a harvester comprising a frame structure, a pair of cooperative augers positioned in side by side relationship and disposed substantially vertically, means mounting said cooperative augers on said frame structure for vertical movement with respect thereto, cutting means at the lower ends of said augers, and endless conveyor means mounted on said frame structure in a generally horizontal position and arranged and constructed for bodily vertical movement with the cooperative augers, and means driving said endless conveyor means whereby crop material elevated by said cooperative augers is removed at the upper end by the endless conveyor means.

References Cited in the file of this patent

UNITED STATES PATENTS

| Number | Name | Date |
|---|---|---|
| 432,650 | Terman | July 22, 1890 |
| 1,630,603 | Boxrud | May 31, 1927 |
| 1,676,105 | Michalka et al. | July 3, 1928 |
| 1,808,113 | Howard | June 2, 1931 |
| 1,903,335 | Falkiner | Apr. 4, 1933 |
| 2,442,520 | Van Sickle | June 1, 1948 |
| 2,477,794 | Gehl | Aug. 2, 1949 |
| 2,571,224 | Edwards | Oct. 16, 1951 |
| 2,648,841 | Hintz | Aug. 18, 1953 |
| 2,648,943 | Shafer et al. | Aug. 18, 1953 |